Nov. 7, 1967   R. A. DOUBT ET AL   3,351,153
SIGNAL GENERATOR

Filed Dec. 27, 1965   2 Sheets-Sheet 1

INVENTORS
R. A. DOUBT
J. P. LINDSEY
Young & Quigg
ATTORNEYS

Nov. 7, 1967   R. A. DOUBT ET AL   3,351,153
SIGNAL GENERATOR
Filed Dec. 27, 1965   2 Sheets-Sheet 2

INVENTORS
R. A. DOUBT
J. P. LINDSEY
BY Young & Quigg
ATTORNEYS

United States Patent Office 3,351,153
Patented Nov. 7, 1967

3,351,153
SIGNAL GENERATOR
Ralph A. Doubt and Joe P. Lindsey, Bartlesville, Okla., assignors to Phillips Petroleum Company, a corporation of Delaware
Filed Dec. 27, 1965, Ser. No. 516,552
8 Claims. (Cl. 181—.5)

ABSTRACT OF THE DISCLOSURE

Seismic signal generator comprises two weights in engagement with one another and having a chamber therebetween to receive an explosive material. An explosive force moves the upper weight upwardly and imparts a force through the lower weight into the earth. Springs either assist or retard movement of the upper weight back into engagement with the lower weight.

---

This invention relates to the generation of seismic signals by imparting vibrations to the earth.

It is common practice in geophysical prospecting to impart vibrations to the earth by detonating explosive charges. While this procedure has been employed for many years, it is not entirely satisfactory for all operations. The explosive charges are generally detonated in shot holes, the drilling of which can be expensive and time consuming. In addition, the resulting explosive charge often generates considerable energy which is propagated in directions other than the desired downward direction. Also, there are many regions in populated areas where explosive charges cannot safely be employed. In recent years other procedures have been developed for generating seismic signals. One such method involves dropping a relatively heavy weight to create vibrations. This weight is normally transported by a truck and is elevated by a derrick. However, the transportation and dropping of a heavy weight also creates problems in many areas.

In accordance with this invention an improved seismic signal generator is provided. The generator comprises a first weight which rests on the earth. A second weight is positioned on top of the first weight and is constructed in such a manner that a chamber is formed between the two weights. An explosive material is positioned within the chamber and detonated so as to provide a rapid increase in pressure. The resulting shock wave imparts a first vibration to the earth. The second weight moves upwardly against the force of gravity due to the expansion in the chamber. The explosive material is then vented and the second weight returns to engage the first weight. In one embodiment of this invention, springs are employed to assist in returning the second weight so that a second vibration is imparted to the earth when the second weight impinges on the first weight.

Figure 3:
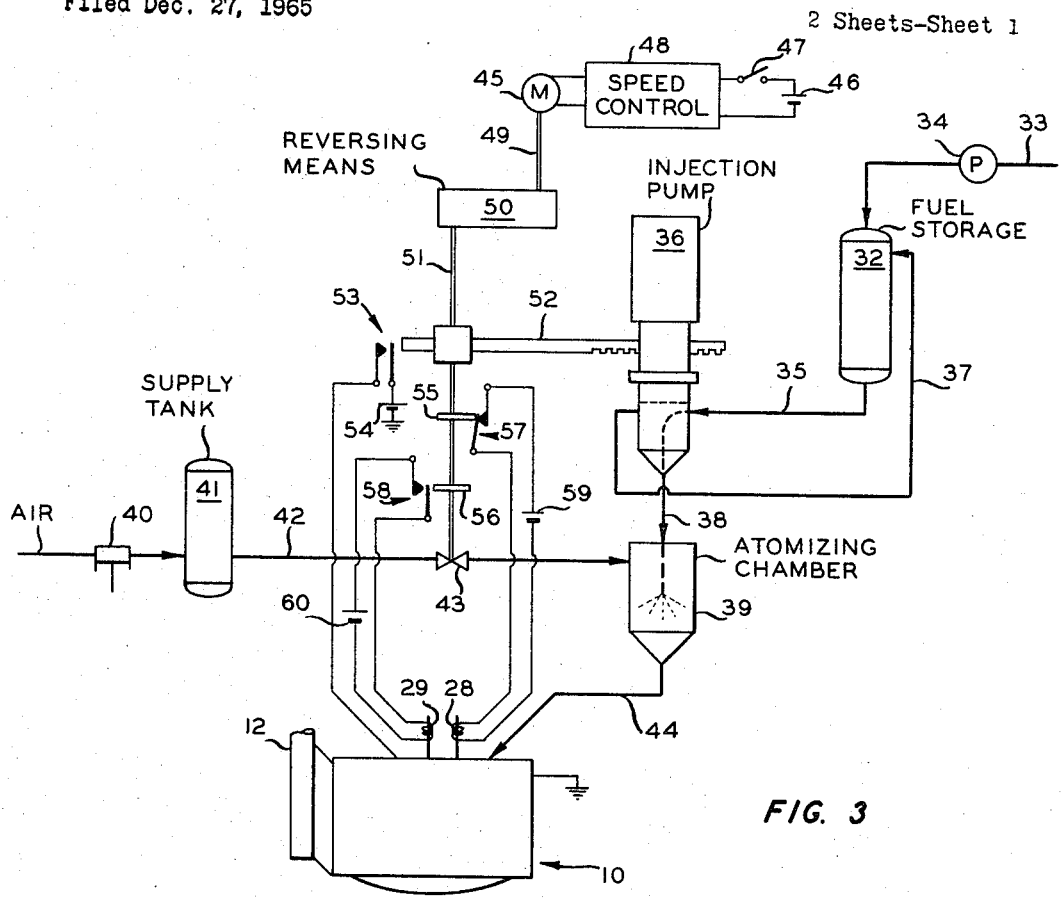
Figure 1:
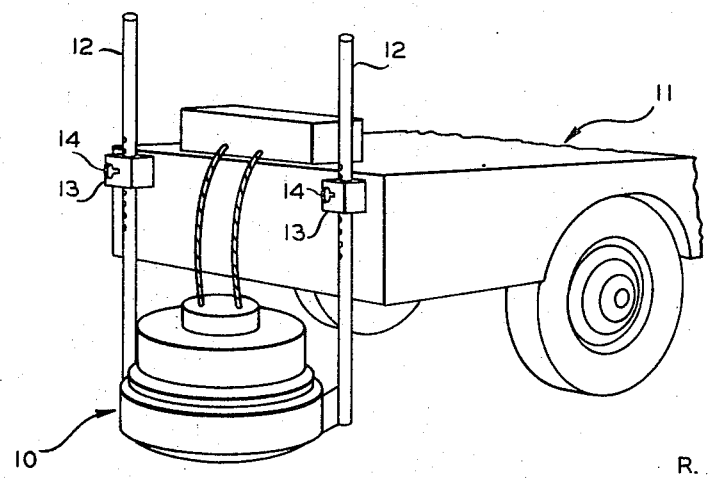
Figure 4:
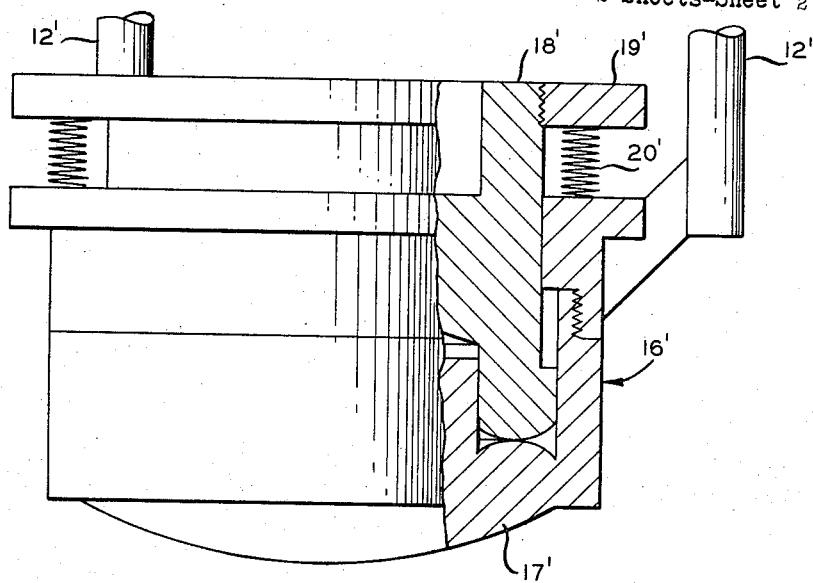
Figure 2:
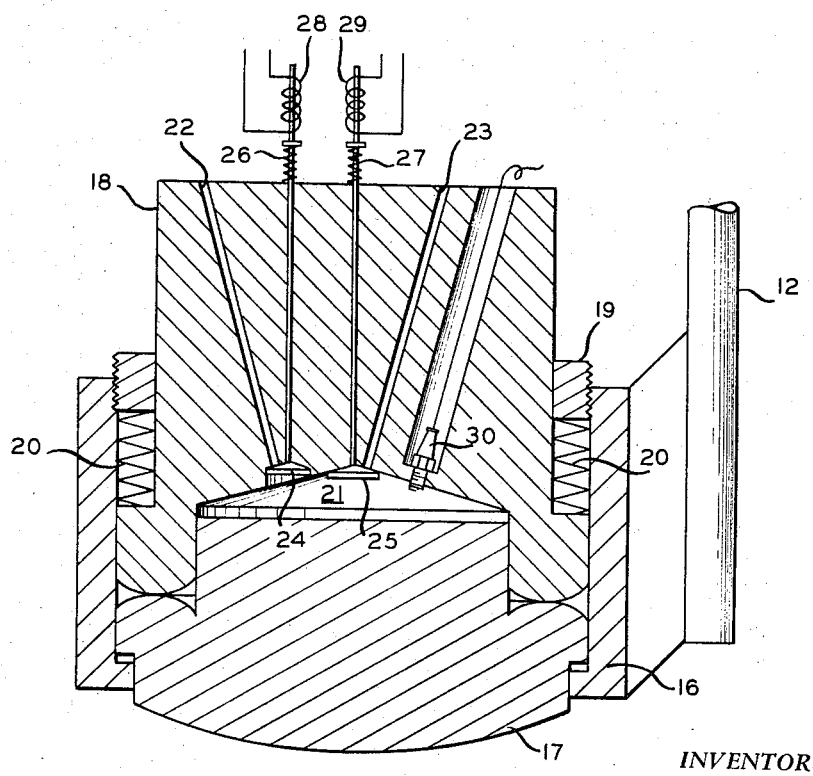

Accordingly, it is an object of this invention to provide an improved signal generator for imparting seismic vibrations. Another object is to provide a signal generator which is capable of providing a controlled number of pulses. Other objects, advantages and features of the invention should become apparent from the following detailed description, taken in conjunction with the accompanying drawing in which:

FIGURE 1 illustrates the signal generator of this invention secured to a truck and positioned to impart vibrations to the earth. FIGURE 2 is a detailed view, shown partially in section, of a first embodiment of the signal generator. FIGURE 3 is a schematic representation of auxiliary equipment employed to supply an explosive mixture to the signal generator. FIGURE 4 is a detailed view, shown partially in section, of a second embodiment of the signal generator.

Referring now to the drawing in detail and to FIGURE 1 in particular, the signal generator 10 is shown positioned to impart vibrations to the earth. As illustrated, the signal generator rests on the ground and is held in place by suitable connections to a truck 11. For example, rods 12 extend from the signal generator through clamping elements 13. These elements can be provided with pins 14 which engage holes in rod 12 so as to permit a vertical adjustment of the position of the signal generator. The signal generator can be lifted away from engagement with the ground when it is being transported from one location to another.

A first embodiment of signal generator 10 is illustrated in detail in FIGURE 2. A hollow cylindrical housing 16 is secured to support rods 12. Housing 16 is provided with a lower inwardly extending lip which serves to support a first weight 17. This weight preferably is provided with a curved lower surface that engages the earth. This permits weight 17 to make good contact with the earth so as to operate in the manner hereinafter described. A second weight 18 is positioned within housing 16 so that the lower surface of weight 18 normally engages weight 17. Weights 17 and 18 are provided with annular sections at their peripheries which are of curved cross section. The purpose of this configuration is described hereinafter. A retainer ring 19 is threaded to housing 16 so as to position a plurality of springs 20 between ring 19 and weight 18. These springs are in compression and tend to hold weight 18 in engagement with weight 17. The degree of force exerted by the springs can be adjusted by raising or lowering retaining ring 19, or by changing the springs. Weights 17 and 18 are of such configuration that a chamber 21 is formed therebetween. Passages 22 and 23 are formed in weight 18 to extend from chamber 21 to regions exterior of the weight. The inner ends of passages 22 and 23 are adapted to be closed by respective valves 24 and 25 which normally are retained in closed positions by respective springs 26 and 27. Solenoids 28 and 29 enclose the stems of respective valves 24 and 25 to open the valves when the solenoids are energized. An ignition means, such as a spark plug 30 is positioned in chamber 21.

Prior to operating the apparatus of this invention to impart seismic vibrations to the earth, it is preferred to tamp the earth section which is to receive the vibrations. This can be accomplished by the use of any desired tamping tool, or by operating the signal generator of this invention. The addition of a liquid, such as water, can also be employed. The initial tamping assumes that good contact will be made between weight 17 and the earth, and permits weight 17 to behave as a rigid body within the elastic medium of the earth. The entire system thus behaves as a mass-spring system that is viscously damped. When it is desired to impart vibrations to the earth, signal generator 10 is lowered from truck 11 so that weight 17 rests on the earth. Housing 16 is lowered so that there is a small clearance between the inner lip of the housing and weight 17. Valve 24 is first opened and an explosive mixture is introduced into chamber 21 through passage 22. Valve 24 is then closed and the explosive mixture is ignited by spark plug 30. The resulting explosion produces a shock wave which is imparted to the earth through weight 17, and the rapid expansion of gases in chamber 21 serves to drive weight 18 upwardly against the combined forces of springs 20 and gravity. Valve 25 is then opened to permit the gases to vent through passage 23. The combined forces of springs 20 and gravity then drive weight 18 downwardly to strike weight 17, and the resulting impact generates a second shock wave which is imparted to the earth.

Suitable apparatus for controlling valves 24 and 25 and spark plug 30 and for supplying the explosive mixture to chamber 21 is illustrated in FIGURE 3. Gasoline or other fuel is delivered to storage tank 32 from a supply conduit 33 which has a pump 34 therein. The fuel is directed from tank 32 through a conduit 35 which communicates with the inlet of an injection pump 36. A bypass conduit 37 returns fuel to storage tank 32 during those portions of the cycle that fuel is not being supplied to the signal generator. An outlet conduit 38 extends from pump 36 to an atomizing chamber 39. Air under pressure is directed from a compressor 40 to a supply tank 41. A conduit 42, which has a control valve 43 therein, extends between tank 41 and chamber 39. The resulting mixture of fuel and air is delivered from chamber 39 through a conduit 44 to passage 22 of FIGURE 2.

The apparatus of FIGURE 3 is controlled by a motor 45 which is connected to a current source 46 by means of a switch 47 and speed control device 48. The drive shaft 49 of motor 45 is connected through a reversing mechanism 50 to a shaft 51. The reversing mechanism is connected such that shaft 51 rotates in a first direction for a first time interval and then rotates in the opposite direction for a second time interval. A first control rod 52 is connected to shaft 51 by a rack and pinion mechanism, not shown, so as to be moved in alternate directions by rotation of shaft 51. Rod 52 is connected to injection pump 36 so that the valve mechanism therein alternately connects conduit 35 with conduits 37 and 38. The second end of rod 52 is adapted to close a switch 53 which connects a voltage source 54 to spark plug 30 of FIGURE 2. Drive shaft 51 turns valve 43 so as to regulate the passage of compressed air into atomizing chamber 39. Shaft 51 is also provided with cams 55 and 56 which control respective switches 57 and 58. Switches 57 and 58 connect current sources 59 and 60 to solenoids 28 and 29, respectively.

The apparatus of FIGURE 3 thus controls the sequence of operations previously described. Injection pump 37 is actuated and valve 43 opened so that a combustible mixture is formed in chamber 39 to be delivered to chamber 21 of FIGURE 2. Switch 57 is then closed to actuate solenoid 28 to open valve 24. Switch 53 is then closed to actuate spark plug 30. After weight 18 has has been driven upwardly, switch 58 is closed to energize solenoid 29 to open valve 25. The apparatus thus operates through one complete cycle when switch 47 is closed for a sufficient length of time to complete the cycle. The cycle will repeat if switch 47 remains closed. If desired, additional mechanism can be employed to open switch 47 automatically at the end of a complete cycle. Alternately, speed control mechanism 48 can be adjusted so that vibrations are imparted periodically at a preselected frequency or at a variable frequency. One particularly advantageous method of operation involves adjusting the frequency of impacts to obtain resonance with the earth. The speed of mechanism 48 can be changed until vibrations of maximum amplitude are received by seismometers employed in making the seismic measurements.

In the second embodiment of the signal generator illustrated in FIGURE 4, lower weight 17' is integral with a housing 16'. Rods 12 are loosely connected to truck 11 so that weight 17' is free to rest on the earth. A retainer ring 19' is threaded to weight 18', and a plurality of springs 20' are positioned between housing 16' and ring 19'. The remainder of the apparatus is substantially identical to that illustrated in FIGURE 2. When an explosive charge is detonated between the two weights, weight 18' moves upwardly against the force of gravity. Springs 20' are constructed so as to be compressed when weight 18' rests on weight 17'. The downward movement of weight 18' is thus retarded by the springs. By suitable selection of the springs, the apparatus can be connected so that weight 18' is returned to its initial position rather slowly and does not impart any appreciable shock wave to the earth when it strikes weight 17'. This operation can be utilized in those exploration methods where only a single pulse is desired.

It will be noted that spherical or circular cross-sections are employed between the two weights in the apparatus of this invention. It is known that a maximum amount of energy is imparted from one body to another if the bodies are spherical. By making the contact areas of the weights of this general configuration, a maximum amount of energy is transmitted from the upper weight to the lower weight.

While this invention has been described in conjunction with presently preferred embodiments, it obviously is not limited thereto.

What is claimed is:

1. Signal generating apparatus comprising a first weight adapted to engage the region to which the signal is to be imparted; a second weight in engagement with said first weight, said first and second weights being of such configuration that a chamber is formed therebetween, said second weight being positioned above said first weight when said first weight rests on a horizontal surface; spring means connected between said first and second weights so that the force exerted by said spring means normally tends to force said second weight away from said first weight, the force so exerted by said spring means being less than the gravitational force exerted by said second weight when said apparatus is opened so that the said second weight is above said first weight; means to introduce an expansible material into said chamber; means to initiate expansion of such material within said chamber so that said second weight is moved away from said first weight; and means to remove expanded material from said chamber to permit said second weight to return to engagement with said first weight by the force of gravity when said first weight rests on a horizontal surface, said spring means resisting the return of said second weight.

2. The apparatus of claim 1 wherein the surface of said first weight which is adapted to engage the region to which the signal is to be imparted is of generally spherical configuration to minimize the area of contact, and wherein the surfaces of said first and second weights which engage one another are of generally circular configuration to minimize the area of contact.

3. The apparatus of claim 1, further comprising a vehicle to transport said weights, and connecting means extending between said first weight and said vehicle, said connecting means being adjustable so that the elevation of said first weight can be varied, said first weight normally resting on the earth when the apparatus is to be actuated.

4. The apparatus of claim 1 wherein said means to introduce and said means to remove comprise a mixing chamber, a source of fuel communicating with said mixing chamber, a source of oxidant communicating with said mixing chamber, first conduit means communicating between said mixing chamber and the chamber between said first and second weights, first valve means in said first conduit means, vent conduit means communicating with the chamber between said first and second weights, second valve means in said vent conduit means, and control means to actuate in series said first valve means, said means to initiate and said second valve means.

5. Signal generating apparatus comprising a housing having a lower inwardly extending lip; a first weight positioned within said housing, said first weight having an outwardly extending shoulder which is adapted to rest on said lip so that said first weight can be supported by said housing, the lower surface of said first weight extending below the bottom of said housing when said shoulder rests on said lip; a second weight positioned within said housing so as to rest on said first weight; said first and second weights being of such configuration that a central chamber is formed therebetween; inlet passage means extending through said second weight to introduce an expansible material into said chamber; means to initiate expansion of said material within said chamber so that said second weight is moved away from said first weight; outlet passage means extending through said second weight to subsequently remove expanded material from said chamber; a retaining member secured to said housing to limit movement of said second weight away from said first weight; and a plurality of springs positioned between said second weight and said retaining member so that movement of said second weight away from said first weight compresses said springs, whereby gravity and the compressed springs subsequently move said second weight back into engagement with said first weight.

6. The apparatus of claim 5 wherein the lower surface of said first weight is of generally spherical configuration to minimize the area of contact between the first weight and the material to which the signal is to be imparted, and wherein the surfaces of said first and second weights which engage one another are of generally circular configuration to minimize the area of contact.

7. The apparatus of claim 5, further comprising a vehicle to transport said housing and weights, and connecting means extending between said housing and said vehicle, said connecting means being adjustable so that the elevation of said housing can be varied, the lower surface of said first weight normally resting on the earth when the apparatus is to be actuated.

8. The apparatus of claim 5, further comprising a mixing chamber, a source of fuel communicating with said mixing chamber, a source of oxidant communicating with said mixing chamber, first conduit means communicating between said mixing chamber and said inlet passage means, first valve means in said inlet passage means, second valve means in said outlet passage means, and control means to actuate in series said first valve means, said means to initiate expansion of said material, and said second valve means.

References Cited
UNITED STATES PATENTS

| | | | |
|---|---|---|---|
| 3,029,733 | 4/1962 | McElroy | 181—.5 |
| 3,209,854 | 10/1965 | Williams | 181—.5 |
| 3,215,223 | 11/1965 | Kirby et al. | 181—.5 |
| 3,235,027 | 2/1966 | Kilmer | 181—.5 |
| 3,260,327 | 7/1966 | McCollum | 181—.5 |
| 3,294,194 | 12/1966 | Sloan | 181—.5 |

BENJAMIN A. BORCHELT, *Primary Examiner.*

G. H. GLANZMAN, *Assistant Examiner.*